(12) United States Patent
Mertmann

(10) Patent No.: US 8,904,882 B2
(45) Date of Patent: Dec. 9, 2014

(54) METHOD FOR DETERMINING THE FLOW RATE ACCORDING TO THE PLUMMET PRINCIPLE AND CORRESPONDING DEVICE

(71) Applicant: KROHNE Messtechnik GmbH, Duisburg (DE)

(72) Inventor: Philipp Mertmann, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 133 days.

(21) Appl. No.: 13/751,642

(22) Filed: Jan. 28, 2013

(65) Prior Publication Data

US 2014/0123769 A1    May 8, 2014

(30) Foreign Application Priority Data

Nov. 2, 2012 (DE) .......................... 10 2012 021 363

(51) Int. Cl.
*G01F 1/28* (2006.01)
*G01F 25/00* (2006.01)
*G01F 23/30* (2006.01)
*G01F 1/22* (2006.01)
*G01F 1/20* (2006.01)

(52) U.S. Cl.
CPC .. *G01F 1/20* (2013.01); *G01F 1/22* (2013.01); *G01F 25/0007* (2013.01)
USPC ............ 73/861.71; 73/305; 73/1.16; 73/1.74; 73/1.33

(58) Field of Classification Search
None
See application file for complete search history.

(56) References Cited

U.S. PATENT DOCUMENTS

| | | | |
|---|---|---|---|
| 2,404,361 A * | 7/1946 | Brewer | 73/861.55 |
| 4,368,646 A | 1/1983 | Rogg | |
| 4,619,146 A | 10/1986 | Teodorescu et al. | |
| 5,186,058 A | 2/1993 | Lew | |
| 5,193,400 A | 3/1993 | Lew | |
| 6,079,279 A | 6/2000 | Büssow et al. | |
| 6,898,984 B2 | 5/2005 | Schöb | |
| 2014/0116130 A1* | 5/2014 | Daheim | 73/290 R |
| 2014/0157886 A1* | 6/2014 | Deilmann et al. | 73/204.11 |

FOREIGN PATENT DOCUMENTS

| | | |
|---|---|---|
| DE | 83 17 576.8 U1 | 1/1985 |
| DE | 196 39 060 A1 | 3/1998 |
| DE | 102 02 067 A1 | 7/2003 |
| DE | 10 2006 028 466 A1 | 12/2007 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A method and device for determining the flow rate of a flowing medium according to the plummet principle is characterized by a simplified determination of the calibration data sets in that at least one set of calibration data is recorded with at least one reference medium under at least one reference measurement condition. Then, a position of a plummet which is dependent on the flowing medium is determined under a measurement condition which differs from the reference condition. Here, the set of calibration data is converted from the reference measurement condition to the measurement condition, and from a determined position of the plummet, a measure for the flow rate of the medium is then determined.

7 Claims, 1 Drawing Sheet

METHOD FOR DETERMINING THE FLOW RATE ACCORDING TO THE PLUMMET PRINCIPLE AND CORRESPONDING DEVICE

BACKGROUND OF THE INVENTION

1. Field of the Invention

The invention relates to a method for determining the flow rate of a flowing medium according to the plummet principle. Furthermore, the invention relates to a device for determining the flow rate of a flowing medium according to the plummet principle with at least one plummet and at least one measuring tube through which the medium can flow, the plummet being movable along an axis in the measuring tube.

2. Description of Related Art

Measuring devices which determine the flow rate of a medium, especially of a fluid such as, for example, liquids or gases, by means of the plummet method, generally have a measuring tube which is located vertically—therefore, in the direction of the terrestrial gravitational field. The measuring tube through which the medium to be measured flows generally has a conical interior which widens in the flow direction. In the cone is a plummet which can move in the flow direction. The medium flows opposite the direction of action of the force of the terrestrial gravitational field, i.e., upward.

The flowing medium applies a force to the plummet in the flow direction which is dependent on the flow resistance of the plummet. Moreover, the buoyancy of the plummet acts in the flow direction. The force due to weight acts against the flow direction so that three forces altogether are acting on the plummet: two in the flow direction and one in the opposite direction. After a transient response the plummet remains at a height at which the three forces are just balanced. In this way, since the position, i.e., the vertical position of the plummet in the measuring tube, is dependent on the flow rate of the medium, this value allows a conclusion about the flow rate.

The height can be determined, for example, by the plummet being located in a viewing glass which is provided with a corresponding scale. Alternatively, as described in German Patent DE 196 39 060 C2, the plummet is connected to a permanent magnet.

The flow rate of the medium results from the determined height depending on a flow coefficient $\alpha$. The flow coefficient $\alpha$ is, in turn, dependent on the geometrical shape of the measuring tube and that of the plummet as well as on the Ruppel number Ru which encompasses medium-specific parameters, such as viscosity and density (see, for example, German Utility Model DE 83 17 576 U1) and which is, however, not dependent on flow rate, in contrast to the Reynolds number. For implementation of the measurement principle in corresponding measurement devices, therefore specifically for each measurement device of the same construction, a data set with the flow coefficient $\alpha$ is determined as a function of the height h and the Ruppel number Ru for the medium which is to be measured and for a host of possible media—this yields the functional relationship $\alpha = f(h, Ru)$—and is stored for evaluation. Here, each data set is dependent especially on the measured medium.

The disadvantage is that the determination of the calibration data sets is very complex, and thus, tedious and costly, since a measurement series must be carried out in particular for each medium.

Furthermore, it is known that the measuring tubes are located not only vertically, but also horizontally, the force due to weight being replaced by the spring force of a spring that acts on the plummet.

Since the calibration data sets which are necessary for the measurements are also dependent on the alignment of the measuring tube and the type of forces acting on the plummet, for a vertical arrangement of the measuring tube it is necessary to generate additional calibration data.

SUMMARY OF THE INVENTION

Therefore, a primary object of the present invention is to provide a method for measuring the flow rate according to the plummet principle which is characterized by a simplification of the determination of the calibration data sets.

The aforementioned object is achieved in accordance with the invention, first of all and essentially, in the method under discussion in that at least one set of calibration data is recorded with at least one reference medium and under at least one reference measurement condition. After this preparation, under a measurement condition which differs from the reference condition, a position of the plummet which is dependent on the flowing medium is determined. This is the actual measurement, the flowing medium in one configuration corresponding essentially to the reference medium. Here, in the actual measurement of the flow rate, proceeding from the set of calibration data, from a conversion of the set of calibration data from the reference measurement condition to the measurement condition, and from the determined position, a measure for the flow rate of the medium is determined. In accordance with the invention, the determination of the calibration data and the actual measurement of the flow rate in the application are ascertained under at least one different (reference) measurement condition. In order to be able to use the calibration data for the actual measurement, a conversion from the calibration measurement condition to the measurement condition during the actual measurement of the flow rate is performed. This makes it possible to use an acquired calibration data set also for different measurement conditions, if the type of transformation of the data of the data set is known.

In one configuration, the set of calibration data is recorded at a first angle of movement of the plummet relative to the terrestrial gravitational field, therefore relative to the direction of extension of the force action of the terrestrial gravitational field; the first angle in practice corresponds therefore to the angle of incline of the measuring tube relative to vertical. In the actual measurement of the flow rate, the position of the plummet is determined at a second angle of the movement of the plummet relative to the terrestrial gravitational field. Here, the first angle and the second angle differ from one another. The plummet moves due to the flowing medium and the force due to weight or another force acting on the plummet (for example, a spring force) along an axis which is at least a longitudinal axis of the measuring tube surrounding the plummet. This axis can now be oriented differently relative to the terrestrial gravitational field. Here, the respective angles between the longitudinal axis and the terrestrial gravitational field differ from one another in the configuration.

In a concrete implementation of the preceding configuration, the set of calibration data is recorded in a horizontal movement of the plummet. For the calibration, the plummet moves up and down horizontally, the medium flowing especially up, i.e., opposite the gravitational field. From the plummet, the height is determined as the relevant position. In the actual flow rate measurement, the position of the plummet is determined in a vertical movement of the plummet in the direction opposite the force of a spring. Since the force due to weight as a virtually resetting force ceases in the horizontal movement, there is a spring which acts on the plummet against the flow direction. In order to be able to use the calibration data also for horizontal motion, for the determination of the value for the flow rate of the medium, the set of vertically determined calibration data is converted in this way by it being considered that a force due to weight is replaced by the force of the spring. For the conversion, therefore, it is also necessary for the characteristics of the spring used to be known. Springs here are generally an elastic element or an arrangement of individual spring elements.

If in the preceding configurations, the reference measurement condition and the measurement conditions relate to the orientation of the axis which the respective plummet moves along, the following configurations are devoted to other conditions. Here, depending on the configuration of the method in accordance with the invention, only one condition differs between the recording of the calibration data and the actual measurement or several different conditions must be detailed for determining the flow coefficient value in order to be able to use the calibration data once they have been determined.

In one configuration, the set of calibration data is recorded with a first geometry of the plummet and the position of the plummet is determined with a second geometry of the plummet. In doing so, the first geometry and the second geometry differ from one another.

The plummet in this configuration is made differently, the conversion of the calibration data taking this into account.

In one alternative or supplementary configuration, the set of calibration data is recorded with a first geometry of a measuring tube surrounding the plummet. In the flow rate measurement, the position of the plummet is determined with a second geometry of the measuring tube which differs from the first geometry. In this configuration, especially the design of the measuring tube and especially of the region in which the plummet is moving is taken into account.

The aforementioned object is achieved according to a further teaching of the invention for determining the flow rate of a flowing medium according to the plummet principle in that there is at least one evaluation unit in the initially named device, the evaluation unit being made for implementation of the method according to one of the aforementioned configurations. The evaluation unit, in particular, undertakes the conversion of at least one set of calibration data. Here, the evaluation unit, in one configuration, is located in the vicinity of the actual measurement means, and thus, optionally, forms a compact sensor. In an alternative configuration, the evaluation unit is farther away from the measuring tube and is optionally even located in a control room.

In one configuration, there is at least one spring. Here, the plummet and the spring are configured, matched to one another and located relative to one another, such that the spring acts on the plummet with a definable spring force. The spring acts especially preferably along an axis on which the plummet is moving, against the direction of flow of the medium which is to be measured. Here, the spring, in one configuration, is a one-piece spring element and in an alternative configuration is composed of a plurality of individual spring elements.

In one configuration, there is at least one storage unit for storage of at least one set of calibration data. The evaluation unit preferably accesses the data to undertake the conversion relative to the measurement condition or conditions which deviate from the reference measurement condition or conditions.

In one configuration, there is at least one inclination sensor. It allows especially the determination of the inclination of the axis which the plummet is moving along during the flow rate measurement. The determined angle is preferably transferred to the evaluation unit for converting the calibration data to the current measurement condition.

In one version the measuring tube is configured for a horizontal arrangement. Here, the storage unit stores at least one set of calibration data which have been determined with a vertically arranged measuring tube. In the horizontal arrangement, especially the aforementioned spring replaces the action of the force due to weight.

In particular, there is now a host of possibilities for embodying and developing the method and device in accordance with the invention. In this regard reference is made to the following description of exemplary embodiments in conjunction with the accompanying drawings.

DETAILED DESCRIPTION OF THE INVENTION

Figure 1:
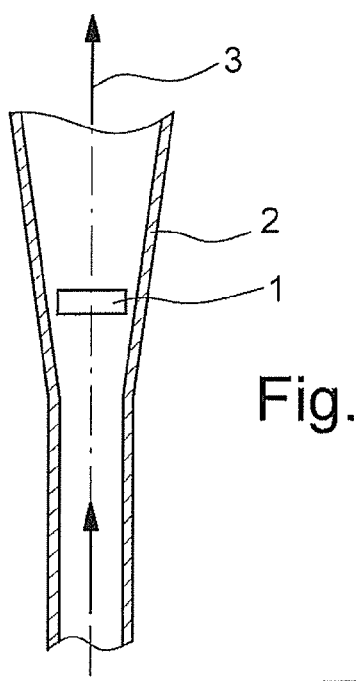
FIG. 1 is a partial schematic sectional view of an arrangement for flow rate measurement.

FIG. 1 schematically shows an arrangement for measuring the flow rate of a medium according to the plummet principle. For this purposes, a plummet 1 is movably arranged in a partially conically shaped measuring tube 2. The orientation here is vertical so that especially the plummet 1 executes movements along the axis 3 which runs in the direction of the terrestrial gravitational field. Here especially, the plummet 1 is made rotationally symmetrical. The flow direction of the medium is indicated by the arrow and runs from bottom to top.

The medium and the buoyancy move the plummet 1 up and the force due to weight acts downward in the opposite direction. At a certain height of the plummet 1 the forces mutually balance one another and the plummet 1 floats after a certain transient phase. The height or in general the position at which the plummet comes to rest is a measure for the flow rate of the medium. Here, it is noted that the height is dependent on the geometry of the plummet and surrounding measuring tube, and on the viscosity and density of the medium. Therefore, for the media which are to be measured, calibration data are recorded which depend on the height and the Ruppel number, the latter describing the dependency on the medium.

Figure 2:
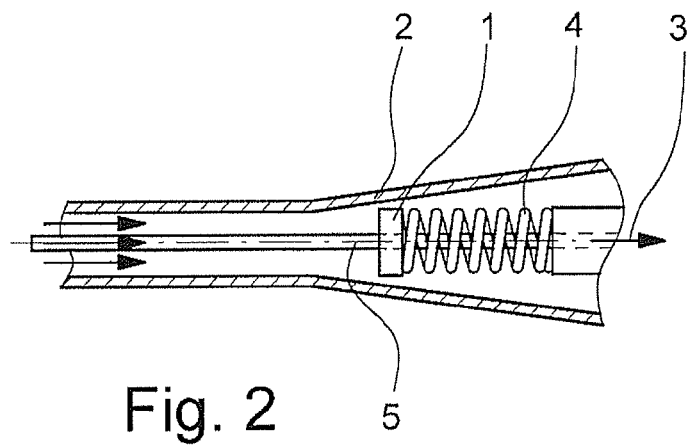
FIG. 2 shows part of another arrangement for flow rate measurement and FIG. 3 is a schematic representation of a device for flow rate measurement.

FIG. 2 shows a horizontal arrangement of the measuring tube 2. Here, the plummet 1 moves along the axis 3 essentially perpendicular to the terrestrial gravitational field. The medium moves likewise horizontally (as indicated by the arrows). In this orientation, since the force due to weight (as in the structure of FIG. 1) is absent in the horizontal alignment, a spring 4 opposes the medium until the plummet 1 is located at a position in which the acting forces mutually cancel one another. This position is likewise a measure for the flow rate, suitable calibration data also being necessary here.

In order to reduce the effort with respect to producing the calibration data, in accordance with the invention, a set of calibration data is determined under a reference measurement condition and is used under a measurement condition which differs from it, a computation from the reference measurement condition to the measurement condition being undertaken.

Thus, for example, with an arrangement according to FIG. 1 and an arrangement of the measuring tube 2 which is perpendicular to the reference measurement direction, at least one set of reference data is obtained. The actual flow rate measurement then takes place with the structure according to FIG. 2 under the measurement condition that the plummet 1 is moving horizontally. The calibration data then relate preferably to the same medium and also the same geometries, but a conversion takes place since not the force due to weight, but the force of the spring 4 in the horizontal orientation is acting on the plummet 1.

Figure 3:
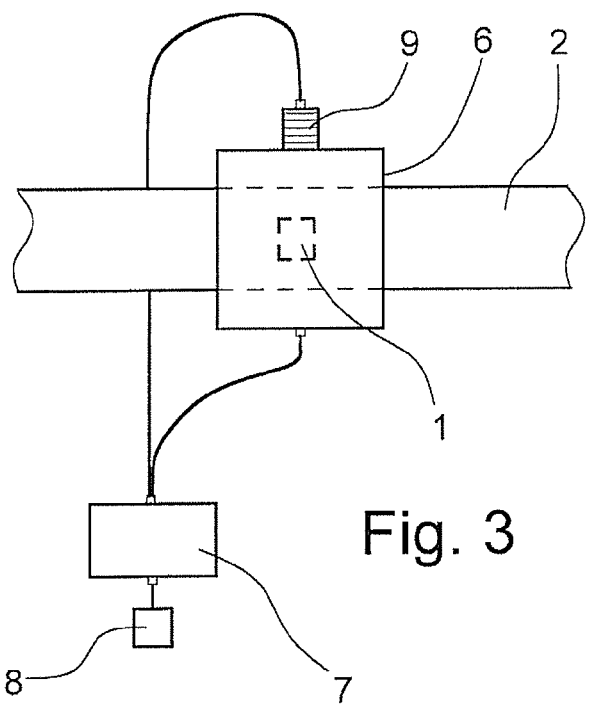

A device in which the method in accordance with the invention is implemented is shown in FIG. 3.

In a horizontally aligned tube, a primary measurement means 6 is placed which is made according to the configuration of FIG. 2 and which allows the measurement of the flow rate of a medium by the plummet 1. This primary measurement means 6 has especially a detection unit which makes it possible to determine the position of the plummet 1. It functions, for example, by the plummet 1 being provided with a permanent magnet whose position outside of the measuring tube can be determined. The determined position of the plummet 1 is transferred to the evaluation unit 7 which still has access to the storage unit 8 in which at least one set of calibration data from a vertical measurement is stored, for example, via an arrangement as in FIG. 1.

On the primary measurement means 6, in this version, there is an inclination sensor 9 which allows the orientation of the axis of the measuring tube of the primary measurement means 6 to be determined. However, depending on the alignment, the inclination sensor 6 can also be omitted.

Proceeding from the orientation of the measuring tube of the primary measurement means 6, a conversion of the calibration data is undertaken in the evaluation unit 7, especially the force due to weight being converted to the correspondingly known and accordingly stored spring force.

In this way, the evaluation unit 7 determines a measure for the horizontal flow rate of the medium based on the calibration data which have been determined in the vertical structure.

What is claimed is:

1. A method for determining the flow rate of a flowing medium according to the plummet principle, comprising the steps of:
   recording at least one set of calibration data for at least one reference medium under at least one reference measurement condition,
   determining a position of a plummet which is dependent on the flowing medium under a measurement condition which differs from the reference condition,
   converting the at least one set of calibration data from the reference measurement condition to the measurement condition,
   and determining a measure for the flow rate of the medium from the determined position;
   wherein the set of calibration data is recorded at a first angle of movement of the plummet relative to the terrestrial gravitational field, wherein the position of the plummet is determined at a second angle of movement of the plummet relative to the terrestrial magnetic field, and wherein the first angle and the second angle differ from one another.

2. The method in accordance with claim 1, wherein the set of calibration data is recorded with a horizontal movement component of the plummet, wherein the position of the plummet is determined with a vertical movement component of the plummet in a direction opposite to a force of a spring acting on the plummet, and wherein a force due to weight is replaced by the force of the spring for determining the measure for the flow rate of the medium, the set of calibration data converted being considered.

3. The method in accordance with claim 1, wherein the set of calibration data is recorded with a first geometry of the plummet and wherein the position of the plummet is determined with a second geometry of the plummet, the first geometry and the second geometry differing from one another and the conversion of the data taking consideration of the difference of geometry into account.

4. The method in accordance with claim 1, wherein the at least one set of calibration data is recorded with a first geometry of a measuring tube surrounding the plummet and wherein the position of the plummet is determined with a second geometry of the measuring tube, and wherein the first geometry and the second geometry differ from one another and the conversion of the data taking consideration of the difference of geometry of the measuring tube into account.

5. A device for determining the flow rate of a flowing medium according to the plummet principle, comprising: at least one measuring tube through which a medium can flow, at least one plummet that is mounted so as to be movable along an axis in the measuring tube, and at least one evaluation unit adapted for recording at least one set of calibration data for at least one reference medium under at least one reference measurement condition with a vertically arranged measuring tube, determining a position of a plummet which is dependent on the flowing medium under a measurement condition which differs from the reference condition, converting the at least one set of calibration data from the reference measurement condition to the measurement condition, and determining a measure for the flow rate of the medium from the determined position;
   wherein, the device further comprising at least one storage unit for storage of the at least one set of calibration data, and
   the measuring tube is horizontally arranged under measurement condition and wherein the at least one set of calibration data stored in said at least one storage unit comprises a set of calibration data which has been determined with a vertically arranged measuring tube.

6. The device in accordance with claim 5, further comprising at least one spring, the plummet and the at least one spring being configured, matched and located relative to one another such that the spring acts on the plummet with a defined spring force.

7. The device in accordance with claim 6, further comprising at least one inclination sensor for the determining the inclination of the axis along which the plummet is movable during flow rate measurement.

* * * * *